US012708061B2

(12) United States Patent
Patel

(10) Patent No.: US 12,708,061 B2
(45) Date of Patent: Aug. 18, 2026

(54) MULTI-DRILL CULTI-ROTAVATOR

(71) Applicant: Chaitanya A. Patel, Ahmedabad (IN)

(72) Inventor: Chaitanya A. Patel, Ahmedabad (IN)

( * ) Notice: Subject to any disclaimer, the term of this patent is extended or adjusted under 35 U.S.C. 154(b) by 1030 days.

(21) Appl. No.: 17/612,961

(22) PCT Filed: Apr. 27, 2021

(86) PCT No.: PCT/IN2021/050408

§ 371 (c)(1),
(2) Date: Nov. 19, 2021

(87) PCT Pub. No.: WO2021/220298

PCT Pub. Date: Nov. 4, 2021

(65) Prior Publication Data

US 2023/0083994 A1 Mar. 16, 2023

(30) Foreign Application Priority Data

Apr. 29, 2020 (IN) ............................ 202021018340

(51) Int. Cl.
*A01B 33/08* (2006.01)
*A01B 33/06* (2006.01)
(Continued)

(52) U.S. Cl.
CPC ............ *A01B 33/082* (2013.01); *A01B 33/06* (2013.01); *A01B 33/106* (2013.01); *A01B 33/146* (2013.01)

(58) Field of Classification Search
CPC ..... A01B 33/10; A01B 33/146; A01B 33/106; A01B 33/06; A01B 33/082; A01B 33/065; A01B 33/021; A01B 35/08; A01B 31/00
See application file for complete search history.

(56) References Cited

U.S. PATENT DOCUMENTS 1,682,224 A * 8/1928 Hicks .................. A01B 17/008 172/46
2,560,443 A * 7/1951 Hosford ................ A01B 39/18 172/46
(Continued)

FOREIGN PATENT DOCUMENTS

CN 205389334 U 7/2016
CN 206602776 U * 11/2017
(Continued)

OTHER PUBLICATIONS

EPO Machine Translation of CN206602776U (Zhang) (Year: 2017).*
International Search Report mailed Aug. 9, 2021, issued to corresponding International Application No. PCT/IN2021/050408.

*Primary Examiner* — Christopher J Sebesta
*Assistant Examiner* — Audrey L Lusk
(74) *Attorney, Agent, or Firm* — Kevin J Fournier IP Legal Services Ltd.; Kevin J Fournier

(57) ABSTRACT

The Multi-drill culti rotavator, according to the present invention, is used for cultivating or ploughing the soil and at the same 10 time, for rotavating the soil for agricultural and gardening purpose. Said culti rotavator effectively drills and cultivates the soil preparing it for the irrigation retaining soil moisture increasing soil absorption capacity of the soil. Said multi drill culti rotavator is hung at the rear end of the tractor. It comprises of: Differential Gear Box Assembly 2, Main Body Assembly 3, Bottom differential Gear box Assembly 4, Gear Axle Assembly 5, End Bearing Housing Assembly 6, Drill Bit Shaft Assembly 7.

8 Claims, 6 Drawing Sheets

(51) Int. Cl.
*A01B 33/10* (2006.01)
*A01B 33/14* (2006.01)

(56) References Cited

U.S. PATENT DOCUMENTS

| | | | | |
|---|---|---|---|---|
| 6,273,197 | B1 * | 8/2001 | Marlow | A01B 45/02<br>172/123 |
| 7,814,984 | B1 * | 10/2010 | Fraley | A01B 33/08<br>172/35 |
| 8,534,372 | B2 | 9/2013 | Patel | 172/44 |
| 8,534,373 | B2 * | 9/2013 | Van Buskirk | A01B 35/16<br>111/139 |
| 2005/0000706 | A1 * | 1/2005 | Maas | A01B 45/02<br>172/21 |
| 2014/0166320 | A1 * | 6/2014 | Olsen | A01B 33/103<br>172/60 |
| 2016/0029541 | A1 * | 2/2016 | Martindale | A01B 33/087<br>172/239 |
| 2017/0172046 | A1 * | 6/2017 | Wehler | A01B 33/142 |
| 2018/0352715 | A1 * | 12/2018 | Quillin | A01B 33/021 |

FOREIGN PATENT DOCUMENTS

| | | | |
|---|---|---|---|
| CN | 207305318 | U | 5/2018 |
| IN | 201831001708 | | 7/2019 |
| KR | 20-0402343 | Y1 | 11/2005 |

* cited by examiner

MULTI-DRILL CULTI-ROTAVATOR

CROSS-REFERENCE TO RELATED APPLICATIONS

This application is a national stage of International Application No. PCT/IN2021/050408, filed Apr. 27, 2021, which claims the benefit of Indian Application No. 202021018340, filed Apr. 29, 2020, in the Indian Patent Office, the entire disclosure of which is incorporated herein by reference.

FIELD OF INVENTION

The present invention relates to the field of agriculture. Particularly, it relates to an agricultural implement used for cultivating or fertilizing the soil. The Multi-drill culti rotavator, according to the present invention, is used for cultivating or ploughing the soil and at the same time, for rotavating the soil for agricultural and gardening purpose.

BACKGROUND OF INVENTION

Agriculture in India is one of the prominent sectors in economy. About 70% population of the India is directly dependent on agriculture. Also, in most of the state economies, this is the main component.

Since the human race started farming, bullocks and other animals are in use to plough the fields. With such routine ploughing, the farmer is able to plough only one furrow at a time and even for this one furrow, prime mover animal has to strain a lot.

In addition, at the end of each furrow, farmer has to lift up the plough and put it in a proposed new direction of next furrow. This is time taking and tiresome also as the farmer remains occupied for the most of the day.

Thereafter, came the era of mechanized agriculture and high speed cultivation with tractors taking the lead. With such cultivation, the big chunk of soil crops out and to break these big chunks, a second implement-"Rotavator" is needed. But this equipment is costly and it consumes separate time and extra fuel consumption. All this affects the national economy and enhances the pollution and adds to global warming.

PRIOR ART AND ITS DISADVANTAGES

The patent no. IN201831001708 relates to a power driven Rota-cultivator for preparing seed bed with better soil tilth. More specifically, the present invention is directed to a tractor drawn rota-cultivator system developed as a combination of tillage implements, which requires lesser fuel and time to prepare seed bed as compared to passive tillage implements usually followed by the Indian farmers. The rota-cultivator according to the present invention, combine the two popular tillage implements i.e. a gang of tynes (passive unit) and rotavator (active unit) and operating them simultaneously favour better soil tilth in less number of passes as compared to the conventional tillage practice followed using individual tillage implements. Its power requirement is also less. Hence, it can be operated by the commonly used tractor by Indian farmers. It has higher field capacity. It utilizes tractor power efficiently. It helps in reducing soil compaction and is simple to fabricate.

The patent no. CN207305318U discloses the multifunctional rotavator, is the utility model including tractor, rotary cultivator, coverer, plough and fertilizer applicator. The rear end of tractor is hung on rotary cultivator, and the rack rear end both sides of rotary cultivator are symmetrically installed with plough, and fertilizer applicator is housed in the rack above plough; the back end activity of plough is provided with coverer. In the multifunction rotavator course of work, rotary tillage, trench digging, fertilizing and the earthing operation in farmland can disposably be completed, solving existing farmland rotary tillage, trench digging, fertilizing and earthing needs more sub jobs, cause work efficiency low, and acquisition cost it is high the problem of, to improve operating efficiency and reduce acquisition cost there is positive dissemination.

The patent no. KR200402343Y1 relates to a tractor rotor cultivator. While reducing the power consumption to be capable of performing a tilling operation, becomes the rotation of the rotating shaft with a plurality of tilling day installed done receive tow is connected to the rear of the tractor is transmitted to the power of the tractor rotor with a pair of skid plate are respectively provided on both sides cultivators Cultivation—depending on the convex surface Sikkim support each fixed to one end portion toward the other end of the direction of movement of the tractor on a pair of skid plate according to the main body and load is made of a metal material is formed of a strip-like bent in an arcuate bend when the tractor and provides a rotor for elevators comprising a pair of flowering glume day, which is installed to a part or all of the remaining portion Hi buried underground.

However said prior art fails to provide multi drill Culti-rotavator. It further does not provide the Culti-rotavator that cultivates the soil with efficient quality and at depth. Further the speed of the cultivation through said Rota cultivator is high that in turn requires substantially more energy, power and fuel yet does not provides the quality cultivation. Moreover is not environment friendly as it generates higher pollution and is also not user friendly and cost effective.

DISADVANTAGES OF PRIOR ART

Most of the conventional multi drill Culti-rotavator suffers from any or all of the below mentioned disadvantages:

They fail to provide a single equipment for cultivating and rotavating the soil efficiently.

They do not provide a multi drill Culti-rotavator that prepares seed bed with better tilth of soil in single pass.

Many of them involves complex working mechanisms and requires higher fuel consumption and power.

Most of them do not cultivate the soil at the greater depth and therefore does not provide quality cultivation and rotavation.

Not all conventional multi drill Culti-rotavators are able to drill and cultivate any or all types of soil including hard soils and thereby are not efficient.

Usage of most of the conventional multi drill Culti-rotavators requires to pre-water or moisturize the soil before the use which in turn requires substantial amount of water. They thus fail to provide multi drill Culti-rotavator that is able to cultivate as well as rotavate the soil simultaneously without pre-watering or moisturizing the soil or waiting for the rain.

They fail to provide the multi drill Culti-rotavator that can prepare the soil for irrigation well before monsoon time, thereby fails to eliminate the need of waiting for rains. Further also, they do not aid in water charging the soil at very first rains and therefore are not energy and time efficient.

They fail to utilize the power of tractor efficiently and further adds to waste of energy resources and thus are not environment friendly.

They do not reduce the physical as well as economical load on the farmers.

They are not economic and environment friendly.

In light of the aforementioned discussion, there exists a need for equipment that would overcome the above mentioned disadvantages.

OBJECTS OF INVENTION

Accordingly the object of the present invention is to provide a multi drill Culti-rotavator. In an aspect the present invention provides multi-drill Culti-rotavator, for preparing seed bed, in order to obtain better tilth of soil in single pass.

It is the object of the present invention to provide a multi drill Culti-rotavator that facilitates pre rain cultivation of the soil thereby making it ready for water charging of the soil. It is also the object of the present invention to provide a multi drill culti rotavator that is able to cultivate soil without pre watering or moisturizing the soil.

In an aspect the present invention provides the multi drill culti rotavator that prevents a large amount of rain water to flood away from the soil thereby increasing its water absorption capacity and retaining moisture content of the soil.

In an aspect the present invention provides a multi drill Culti-rotavator that is able to cultivate as well as rotavate the soil simultaneously without pre-watering or moisturizing the soil. In yet another aspect the present invention provides a multi drill Culti-rotavator that cultivates the soil at the greater depth thereby increasing its efficiency at much less fuel consumption.

It is also the object of the present invention to provide a multi drill Culti rotavator that enables the farmers to prepare the soil for the next cultivation, shortly after harvesting the previous crop. In an aspect the present multi drill Culti-rotavator is able to churn the residues of the previously harvested corps and grass mixes with the soil and thereby improves the soil fertility.

In other object of the present invention it provides multi-drill Culti-rotavator that requires less fuel compared to conventional tillage practice, followed using individual tillage implements thereby reducing the carbon footprint in the environment thus being environment friendly.

In another object of the present invention it provides a multi-drill culti rotavator that is able to drill and cultivate any or all types of soil including hard soils and thereby is efficient.

In yet another object the present invention facilitates leveling of the soil.

In another object the present invention minimizes soil erosion and thus is efficient and environment friendly. In an aspect it provides the culti rotavator that requires less time and is faster and simple to operate and maintain.

In yet another aspect of the present invention, said multi drill culti rotavator efficiently utilizes the power of the tractor thus being energy efficient. In an aspect the present invention reduces the wear and tear of the tractor, utilizes optimum fuel and provides maximum output. Thus is energy efficient.

In yet another object the present multi drill culti rotavator reduces the physical as well as the economic load on the farmers thus is economic and user friendly.

In yet another object the present multi drill culti rotavator reduces Soil Erosion.

In yet another aspect the present invention obviates the disadvantages of the prior art providing the multi drill culti rotavator.

SUMMARY OF THE PRESENT INVENTION

Figure 1A:
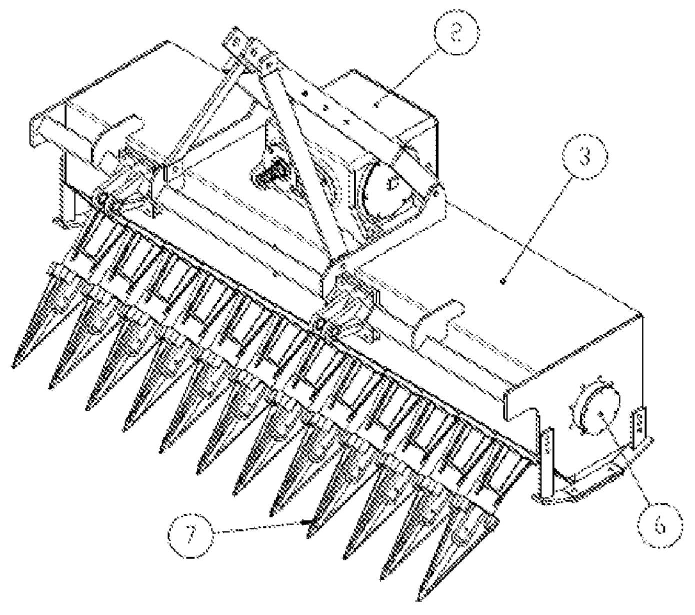
FIG. 1A: | Shows the front view of present multi drill culti rotavator P |
|
Figure 1B:
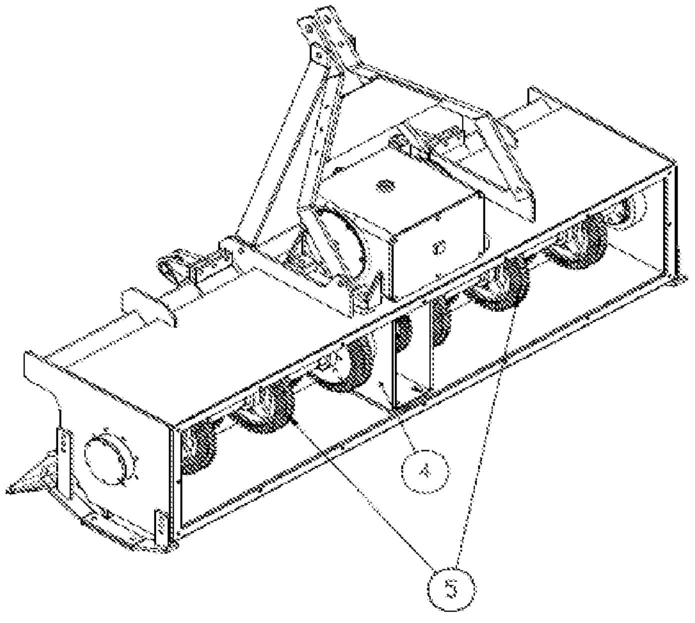
FIG. 1B: | Shows the back view of present invention P |
|

In order to achieve the foregoing objects the present invention provides a multi drill culti-rotavator that prepares seed bed with substantially improved tilth in single pass. Said culti rotavator effectively drills and cultivates the soil, preparing it for the irrigation, retaining soil moisture, increasing soil absorption capacity of the soil. Said multi drill culti rotavator is hung at the rear end of the tractor. It comprises of:

Differential Gear Box Assembly 2,
Main Body Assembly 3,
Bottom differential Gear box Assembly 4,
Gear Axle Assembly 5,
End Bearing Housing Assembly 6,
Drill Bit Shaft Assembly 7.

It facilitates producing multifold work at a time. Wherein the drilling process, dropping the seeds in furrows in a continuous flow and then covering them with soil.

Moreover the rotavator blades of the present invention, enables the transfer impact on soil surface throwing the soil upward due to its rotating speed. It facilitates breaking of big chunks of soil and making it ready for any plantation or seeding at the same time, that to in a single pass instead of multiple passes for cultivation.

DETAILED DESCRIPTION OF INVENTION

An embodiment of the present invention provides a multi drill culti rotavator P for cultivating or ploughing the soil and at the same time, for rotavating the soil for agricultural and gardening purpose. Said multi drill Culti-rotavator is energy efficient, user friendly, ecofriendly as well as saves substantial time. The present invention cultivates as well as rotavates the soil in a single pass utilizing minimum tractor fuel and provides maximum output.

MEANING OF REFERENCE NUMERALS USED IN THE PRESENT MULTI DRILL CULTI ROTAVATOR P

P: Present Multi Drill Culti-Rotavator
2: Differential Gear Box Assembly
3: Main Body Assembly
4: Bottom differential Gear box Assembly

5: Gear Axle Assembly
6: End Bearing Housing Assembly
7: Drill Bit Shaft Assembly
2.1: Gear Box
2.2: Spur Gear For Primary Shaft
2.3: Spur Gear For Secondary Transmission Shaft
2.4: Primary Input Shaft
2.5: Secondary Transmission Shaft
2.6: Bearing Cover for Primary shaft & Secondary Shaft
2.7: Straight Bevel For Secondary Transmission shaft
2.8: Straight Bevel for Tertiary shaft
2.9: Bearing Housing for tertiary shaft
2.10: Tertiary Shaft
2.11: Straight Bevel for Differential Gear Box
3.1: Front Cover Plate
3.2: Top Cover plate
3.3: Side cover support plate
3.4: Front Support square pipe
3.5: Bracket Plate
3.6: Bracket cover plate
3.7: Main gear box mounting flat Bar
3.8: Protector
3.9: Lifting Arms
3.10: Differential gear box fixing plate
4.1: Differential Gear Box bearing housing
4.2: Straight Bevel for Differential Gear Box
4.3: Axle for Differential Gear Box
4.4: Differential Gear Box Plate
5.1: Axle
5.2: Flange for Axle
5.3: Main spiral Bevel Gear
5.4: Collar for Main Gear
5.5: Collar for middle main gear
6.1: End Bearing Housing
6.2: Axle for End Bearing Housing
6.3: End Bearing Housing Cover
7.1: Drill bit Shaft
7.2: Drill bit
7.3: Drill Bit Bearing Housing
7.4: Spiral bevel gear
7.5: Rotavating blade Referring to FIG. 1 to FIG. 6B, present multi drill culti rotavator P comprises;

Differential Gear Box Assembly 2,
Main Body Assembly 3,
Bottom differential Gear box Assembly 4,
Gear Axle Assembly 5,
End Bearing Housing Assembly 6,
Drill Bit Shaft Assembly 7;

Said differential Gear box Assembly 2 is the main gear box assembly facilitating the plurality of gears in the present invention. It is connected to the main body Assembly 3. Differential Gear box Assembly 2 in turn comprises:

Gear Box 2.1,
Spur Gear for Primary Shaft 2.2,
Spur Gear for Secondary Transmission Shaft 2.3,
Primary Input Shaft 2.4,
Secondary Transmission Shaft 2.5,
Bearing Cover for Primary shaft & Secondary Shaft 2.6,
Straight Bevel for Secondary Transmission shaft 2.7
Straight Bevel for Tertiary shaft 2.8
Bearing Housing for tertiary shaft 2.9
Tertiary Shaft 2.10,
Straight Bevel for Differential Gear Box 2.11

Figure 2:
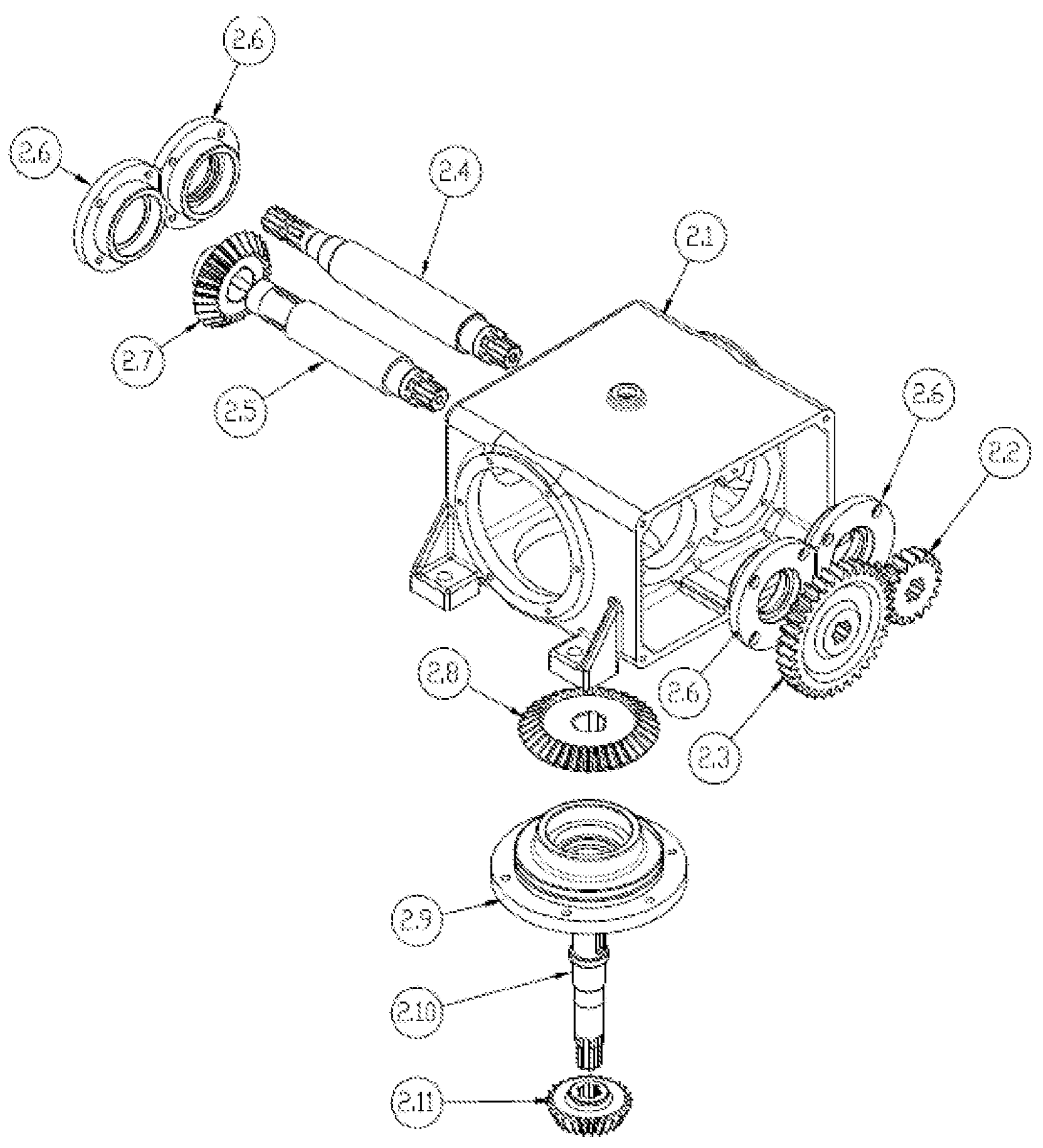
FIG. 2: | Shows the fragmented view of Differential Gear Box Assembly 2 of the present Invention P. |
|

Referring to FIG. 2; said gear box 2.1 is provided to house the plurality of gears and is connected to Bearing Cover for Primary shaft & Secondary Shaft 2.6 on one side and to Primary Input Shaft 2.4 and Secondary Transmission Shaft 2.5, at the other. Said primary input shaft 2.4 is connected to the power take off shaft of the tractor and takes the input power from the power take off shaft of the tractor and is connected to Bearing Cover for Primary shaft & Secondary Shaft 2.6 on the other side. Secondary Transmission Shaft 2.5 is connected to the Straight Bevel for Secondary Transmission shaft 2.7 and is provided for power transmission. Said Spur Gear for Primary Shaft 2.2, is connected to the Bearing Cover for Primary shaft & Secondary Shaft 2.6. Said Spur Gear for Secondary Transmission Shaft 2.3 is connected to the Bearing Cover for Primary shaft & Secondary Shaft 2.6. Said Bearing Housing for tertiary shaft 2.9 holds Straight Bevel for Tertiary shaft 2.8 and is connected to Tertiary Shaft 2.10 on the other end. Straight Bevel for Tertiary shaft 2.8 Said Tertiary Shaft 2.10 is in turn connected to the Straight Bevel for Differential Gear Box 2.11 on the other end.

Figure 3:
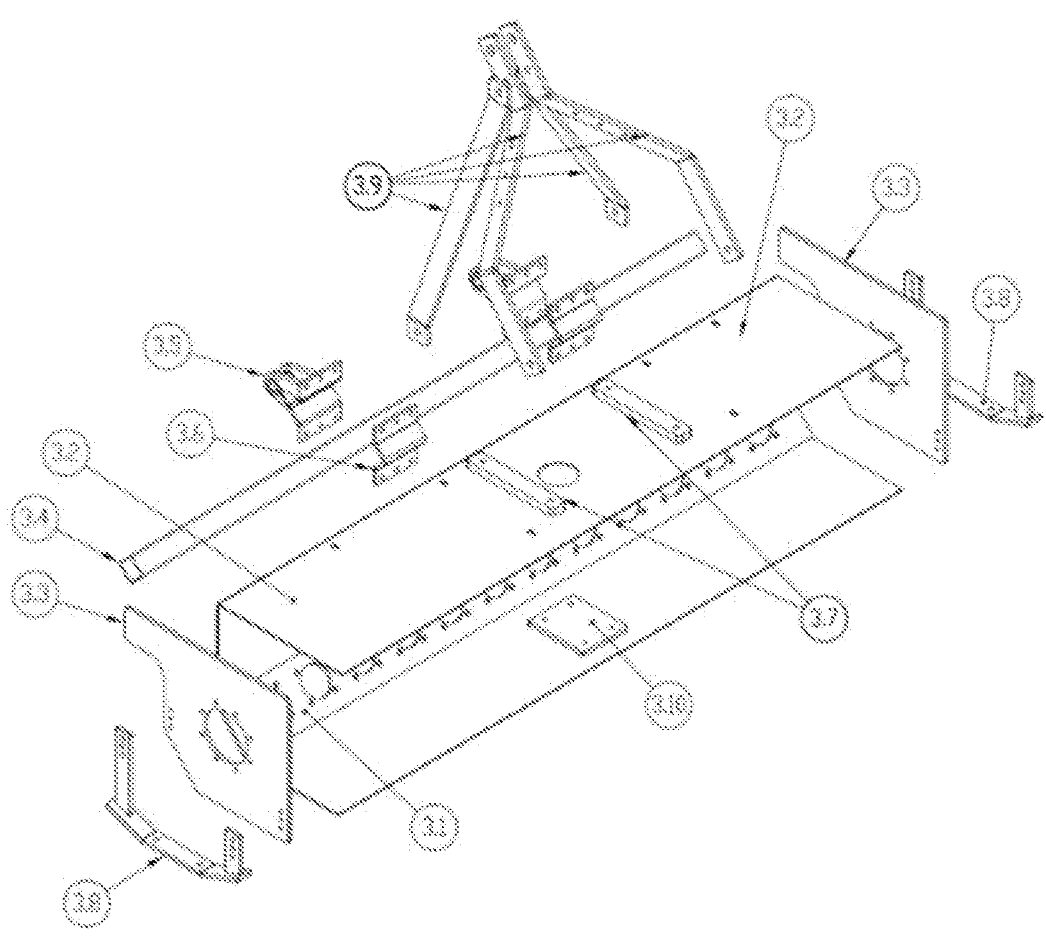
FIG. 3: | Shows the Fragmented view of Main Body Assembly 3 of the present Invention P. |
|

Referring to FIG. 3, said main body Assembly 3 is pentagonal and is attached to the Differential Gear Box Assembly 2 on one side and to Bottom differential Gear box Assembly 4 on the other. The main body Assembly 3, holds the differential gear box assembly 4 and comprises of:

Front Cover Plate 3.1,
Top Cover plate 3.2,
Side cover support plate 3.3,
Front Support square pipe 3.4,
Bracket Plate 3.5,
Bracket cover plate 3.6,
Main gear box mounting flat Bar 3.7
Protector 3.8,
Lifting Arms 3.9,
Differential gear box fixing plate 3.10;

Said Front Cover Plate 3.1, Top Cover plate 3.2, Side cover support plate 3.3 and Front Support square pipe 3.4 are provided to cover the Bottom differential Gear box Assembly 4. Said bracket cover plate 3.6 covers the Bracket plate 3.5 attached to Front Support square pipe 3.4. Said Bracket plate 3.5 is provided for fitting the gears on the back side of tractor. Said Gear box 2.1 is mounted over the Main gear box mounting flat Bar 3.7. The protector 3.8 at the either edges of the main body Assembly 3 protects the main body Assembly 3. Said Lifting Arms 3.9 connected to the Front Support square pipe 3.4 are provided to lift the present invention, The Differential gear box fixing plate 3.10 is provided to connect the bottom differential gar box assembly 4.

Figure 4:
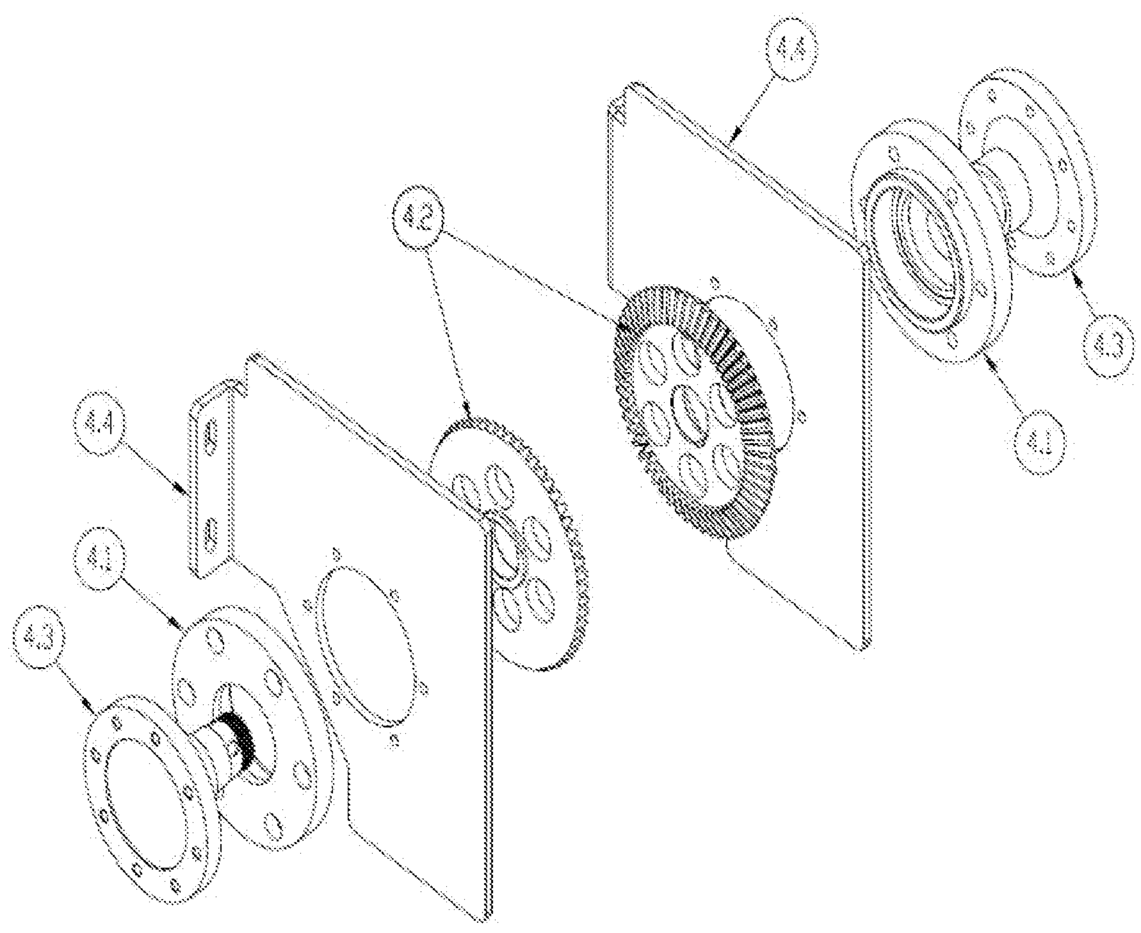
FIG. 4: | Shows the Fragmented view of bottom differential Gear box Assembly 4 of the present invention P. |
|

Referring to FIG. 4, said Bottom differential Gear box Assembly 4 connected to the Gear Axle Assembly 5 on either sides is provided to control the motion of the present invention. In turn said Bottom differential Gear box Assembly 4 comprises:

Differential Gear Box bearing housing 4.1,
Straight Bevel for Differential Gear Box 4.2,
Axle for Differential Gear Box 4.3,
Differential Gear Box Plate 4.4;

Said Differential Gear Box bearing housing 4.1, houses Axle for Differential Gear Box 4.3 and Differential Gear Box Plate 4.4 on either sides. Said Differential Gear Box 4.3 is provided to transmit the power from Straight Bevel for Differential Gear Box 4.2 to Gear Axle Assembly 5. Said Differential gear box plate 4.4 is connected to the Straight Bevel for Differential Gear Box 4.2 and is attached to said gear box 2.1. Said Axle for Differential Gear Box 4.3 connects Gear Axle Assembly 5 on both side.

Figure 5:
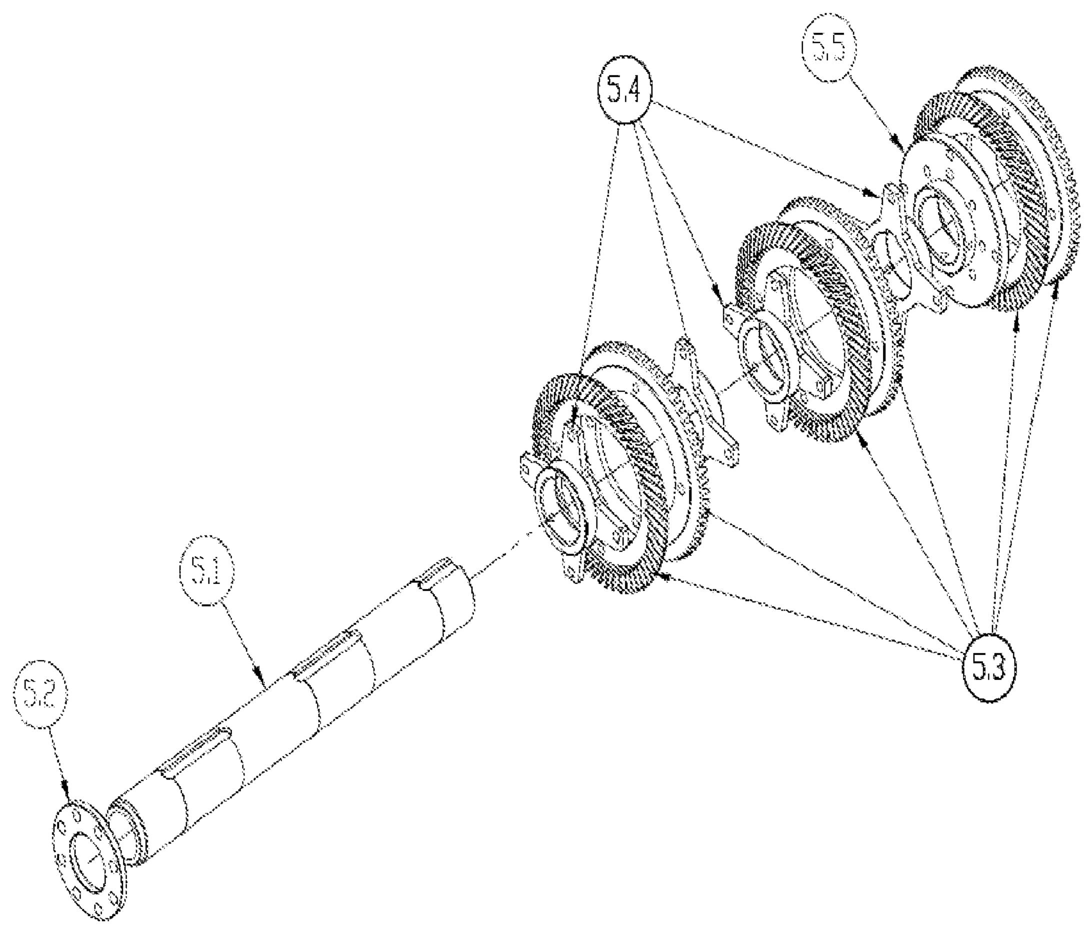
FIG. 5: | Shows the Fragmented view of Gear Axle Assembly 5 of the present invention P. |
|

Referring to FIG. 5, said Gear Axle Assembly 5, is connected to the Bottom differential Gear box Assembly 4.

Said Gear Axle assembly 5 consists of plurality of spiral gears more preferably twelve gears; six gears in pair. It is provided to transmit the power from Gear Axle Assembly 5 to End Bearing housing Assembly 6 and further comprises:

Axle 5.1,
Flange for Axle 5.2,
Main spiral Bevel Gear 5.3,
Collar for Main Gear 5.4,
Collar for middle main gear 5.5;

Said axle 5.1 is connected to the flange for axle 5.2 on one end and to the collar for main gear 5.4 on the other end. Said axle 5.1 is provided for rotating six pair of spiral gears. The flange for axle 5.2 supports the axle 5.1 and collar for main gear 5.4. Said collar for main gear 5.4 houses Main spiral Bevel Gear 5.3. Said Main spiral Bevel Gear 5.3 are in plurality more preferably in pairs of six. They translate the force from one direction into another direction with the power of said axle 5.1. Thus they enable the rotation when the rotation of the shafts are interchanged. This enables the rotation in both clockwise as well as anti-clockwise directions.

Figure 6A:
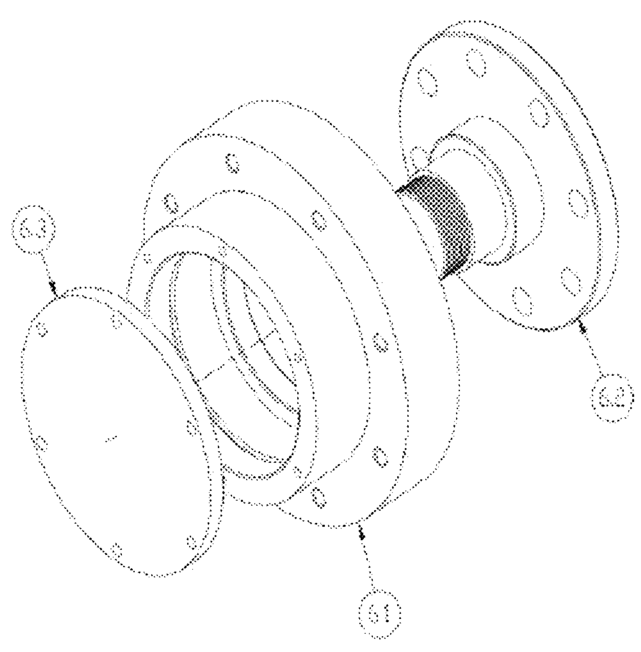
FIG. 6A: | Shows the Fragmented View of End Bearing Housing Assembly 6A of the present invention P. |
|

Referring to FIG. 6A, said End Bearing housing Assembly 6 is attached to main body assembly 3. Said end bearing housing assembly in turn comprises:

End Bearing Housing 6.1,
Axle for End Bearing Housing 6.2,
End Bearing Housing Cover 6.3;

Said end bearing housing 6.1 is connected to end bearing housing cover 6.3. Said Axle for End Bearing Housing 6.2 is housed in the end bearing housing 6.1 and is provided to connect with Gear Axle Assembly 5

Figure 6B:
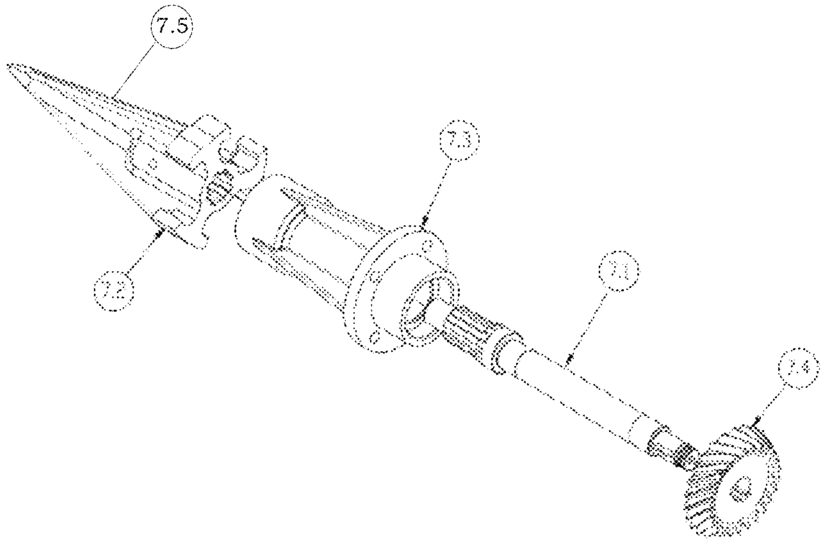
FIG. 6B: | Shows the Fragmented View of Drill Bit Shaft Assembly 6B of the present invention P. |

Referring to FIG. 6B, said Drill bit shaft Assembly 7 is the main assembly provided to transmit the power from spiral bevel gears to drill bit 7.2 in clockwise and anticlockwise direction and is attached to Bottom differential Gear box Assembly 4. Said drill bit shaft assembly 7 comprises:

Drill bit Shaft 7.1,
Drill bits 7.2,
Drill Bit Bearing Housing 7.3,
Spiral bevel gear 7.4;
Rotator blade 7.5

Said Drill bit shaft 7.1 connects the drill bit bearing housing 7.3 and spiral bevel gear 7.4. It further transfers the input power to the said drill bit 7.2. Said spiral bevel gear 7.4 is provided in plurality, more preferably, six in pair and are in connection with corresponding Main spiral Bevel Gear 5.3. It provides the motion to the present invention P.

Said spiral bevel gears 7.4 are in turn connected to the plurality of drill bits 7.2; more preferably, twelve drill bits 7.2. Said drill bits 7.2 cultivate and rotate any and all types of soil including hard soils. Said plurality of drill bits 7.2 are connected to corresponding rotavation blades (7.5). Wherein each drill bit 7.2 comprises ploughing section with the plurality of rotavator blades 7.5 preferably three, which are curved on flat on the upper most edge of the drill bit 7.2 at 120° with outward convexity. Said blades 7.5 are fixed perpendicularly to the drill bits which further will initiate rotation of each in reverse direction than that of the adjoining drill bit; drilling multiple furrows at a time.

WORKING OF PRESENT INVENTION

The present Multi drill culti rotavator P, is connected to the power output shaft (PTO) shaft of the tractor and is utilized to cultivate the soil. The working of the present invention further is described herein below:

Step: 1

The present invention P works on the power of the tractor and takes the input power from the power take off shaft of the tractor. The input power to the present invention P is transferred by said Primary Input Shaft 2.4 and Secondary Transmission Shaft 2.5.

The lifting arms 3.9 arises from the either side of the gear box 2.1; projecting upwards and inclining forwards and thus gets attached with the tractor's lifting fork arms. While said lifting arms 3.9 are attached to the tractor's lifting fork arms said Primary Input Shaft 2.4 is connected to the power takeoff shaft of the tractor.

Step 2

The input power from the Primary Input Shaft 2.4 and Secondary Transmission Shaft 2.5 is transmitted further to said Spur Gear for Primary Shaft 2.2 and Spur Gear for Secondary Transmission Shaft 2.3.

Step 3

The input power than rotates the plurality of Main spiral Bevel Gear 5.3 attached to the corresponding Spiral bevel gear 7.4. Said Main spiral Bevel Gear 5.3 translates the force from one direction into another direction with the power of said axle 5.1. Thus they enable the rotation when the rotation of the shafts are interchanged. This enables the rotation in both clockwise as well as anti-clockwise directions.

Step 4

The input power from said Spiral bevel gear 7.4 is transferred to the corresponding plurality of drill bit 7.2 through Drill bit shaft 7.1. The drill bits 7.2 connected to the corresponding rotavation blades 7.5 initiate rotation of each drill bit 7.2 in reverse direction than that of the adjoining drill bit 7.2; drilling multiple furrows at a time.

Thus, accordingly the present invention provides a multi-drill Culti-rotavator, composed as described above, would cultivate and rotavate any type of soil and that, in significantly reduced time than by routine tractor cultivation and using significantly less fuel, meaning again significantly reduced pollution. Therefore, it is efficient, economical and easy to operate.

COMPARISON OF THE EFFICIENCY PROVIDED BY THE PRESENT INVENTION AND EFFICIENCY OF PRIOR ART

Cultivation Through Conventional Methods

TABLE 01

| Time Taken Per | | Diesel Usage Per | | Work Output Per 8 Hours(only single work cultivation) | | Cultivation to Rotavation & Seeding Completed Units/8 Hours | | Summary Of One Day's |
|---|---|---|---|---|---|---|---|---|
| Acre | Vigha | Acre | Vigha | Acres | Vigha | Acre | Vigha | Completed Units |
| 2 hours 30 min | 1 hour 30 min | 11.62 liters | 7 liters | 6 Acre | 10 Vigha | 1.2 Acre | 2 Vigha | 31 Liters Per Day (8 Hrs) Completing 1.2 Acres/2 Vigha |

Cultivation Through Present Invention

TABLE 02

| Time Taken Per | | Diesel Usage Per | | Work Output Per 8 Hours | | Cultivation to Rotavation & Seeding Completed Units/8 Hours | | Summary Of One Day's |
|---|---|---|---|---|---|---|---|---|
| Acre | Vigha | Acre | Vigha | Acres | Vigha | Acre | Vigha | Completed Units |
| 1 hour 38 min | 45 mins | 5.81 liters | 3.5 liters | 6.38 Acres | 10.6 Vigha | 6.38 Acres | 10.6 Vigha | 37 Liters Per Day (8 Hrs) Completing 6.38 Acre/10.6 Vigha |

With reference to above table 01, the time taken, fuel required and output generated to cultivate, rotavate and seeding the soil per acre and vigha by the conventional devices and methods is shown. The conventional devices/method can either cultivate or rotavate or seed the soil at a time. Also the time required, fuel consumption and output is much more. With conventional methods/device it shall require 31 liters of fuel per day completing only 1.2 acres/2 Vigha of soil cultivation with an average of 8 working hours.

Now, referring to table 02, shows the time taken, fuel required and output generated to cultivate, rotavate and seeding the soil per acre and vigha by the present invention P. The present invention cultivates, rotavates and seeds the soil in a single pass. Also the time required, fuel consumption and output is substantially less. The present invention shall require 37 liters of fuel per day completing 6.8 acres/10.6 Vigha of soil cultivation, rotavation and seeding of the soil with an average of 8 working hours. Thus, is substantially efficient, environment friendly, time saving, provides more output and is cost effective.

The invention claimed is:

1. A multi drill culti rotavator P cultivating and rotavating soil in a single pass, wherein the multi drill culti rotavator P comprises:

a Differential Gear Box Assembly (2);

a Main Body Assembly (3);

a Bottom differential Gear box Assembly (4);

a Gear Axle Assembly (5);

an End Bearing Housing Assembly (6); and a Drill Bit Shaft Assembly (7) comprising a plurality of drill bits;

wherein said Differential Gear Box Assembly (2) comprises a plurality of gears and is connected to the main body Assembly (3);

said Main Body Assembly (3) is pentagonal and is attached to the Differential Gear Box Assembly (2) on one side and to the Bottom differential Gear box Assembly (4) on the other side;

said Main Body Assembly (3) holds the Bottom differential Gear box Assembly (4);

said Bottom differential Gear box Assembly (4) is connected to the Gear Axle Assembly (5) on either side;

said Gear Axle Assembly (5) comprising a plurality of main spiral bevel gears (5.3), is connected to the Bottom differential Gear box Assembly (4) to transmit power from the Gear Axle Assembly (5) to the End Bearing Housing Assembly (6);

said End Bearing Housing Assembly (6) is attached to Main Body Assembly (3); and said Drill Bit Shaft Assembly (7) is configured to transmit power from the main spiral bevel gears (5.3) to a plurality of drill bits (7.2) to rotate adjoining ones of the plurality of drill bits (7.2) in opposing clockwise and anticlockwise directions and which are attached to said Bottom differential Gear box Assembly (4);

wherein said Drill Bit Shaft Assembly (7) comprises;

a plurality of Drill bit Shafts (7.1);

a plurality of Drill bits (7.2);

a plurality of Drill Bit Bearing Housing (7.3); and a plurality of Spiral bevel gears (7.4);

wherein each said Drill bit Shaft (7.1) is configured to connect a respective one of the drill bit bearing housings (7.3) and a respective one of the spiral bevel gears (74), transfer the input power to a respective one of said plurality of drill bits (7.2);

each said spiral bevel gear (7.4) is in connection with a respective one of the Main spiral Bevel Gears (5.3) and configured to provide motion to a respective one of the drill bits (7.2);

wherein said main spiral bevel gears (5.3) are provided in pairs and geared with respective ones of the spiral bevel gears (74), where the main spiral bevel gears (5.3) rotate in pair to rotate the said paired spiral bevel gears (7.4) in opposite rotational directions to rotate the drill bits (7.3) in opposite rotational directions from the adjoining ones;

each drill bit (7.2) comprises a ploughing section with a plurality of curved rotavator blades (7.5) on the upper most edge of the drill bit (7.2) and positioned at 102 degrees with outward convexity with respect to the drill bit (7.2);

each said spiral bevel gear (7.4) is connected to a respective one of the plurality of drill bits (7.2) connected to the corresponding rotavation blades; and said rotavating blades (7.5) are fixed perpendicularly to the drill bits (7.2) configured to initiate rotation in a reverse direction than that of the adjoining drill bit to drill multiple furrows at a time.

2. The multi drill culti rotavator as claimed in claim 1, wherein said Differential Gear Box Assembly (2) comprises:

a Gear Box (2.1);

a Primary Input Shaft (2.4), a Secondary Transmission Shaft (2.5), a tertiary shaft (2.10);

the plurality of gears of the differential Gear Box Assembly comprising:

a Spur Gear for the Primary Shaft (2.2), a Spur Gear for the Secondary Transmission Shaft (2.3), a Bearing Cover for the Primary shaft and the Secondary shaft (2.6), a Straight Bevel for the Secondary Transmission shaft (2.7), a Straight Bevel for the Tertiary shaft (2.8), a Bearing Housing for the tertiary shaft (2.9), and a Straight Bevel for the Differential Gear Box (2.11);

wherein Said gear box (2.1), houses the plurality of gears and is connected to the Bearing Cover for the Primary Input shaft and the Secondary Transmission Shaft (2.6) on one side and to the Primary Input Shaft (2.4) and the Secondary Transmission Shaft (2.5) at the other;

Said primary input shaft (2.4) is configured to take input power from a power take off shaft of the tractor and is connected to the power take off shaft of the tractor on one side and to the Bearing Cover for the Primary Input shaft & the Secondary Transmission Shaft (2.6) on the other side; said Secondary Transmission Shaft (2.5) is connected to the Straight Bevel for the Secondary Transmission shaft (2.7) and is configured for power transmission;

Said Spur Gear for the Secondary Transmission Shaft (2.3) is connected to the Bearing Cover for the Primary Input shaft and the Secondary Input Shaft (2.6); the input power from the Primary Input Shaft (2.4) an Secondary Transmission Shaft (2.5) is transmitted to said Spur Gear for the Primary Input Shaft (2.2) and the Spur Gear for the Secondary Transmission Shaft (2.3);

Said Spur Gear for the Primary Input Shaft (2.2) is connected to the Bearing Cover for the Primary Input shaft & the Secondary Transmission Shaft (2.6);

Said Bearing Housing for the tertiary shaft (2.9) holds the Straight Bevel for the Tertiary shaft (2.8) and is connected to the Tertiary Shaft (2.10) on the other end; and Said Tertiary Shaft (2.10) is connected to the Straight Bevel for the Differential Gear Box (2.11) on the other end.

3. The multi drill culti rotavator as claimed in claim 1, wherein said main body Assembly (3) comprises a Front Cover Plate (3.1), a Top Cover plate (3.2), a Side cover support plate (3.3), a Front Support square pipe (3.4), a Bracket Plate (3.5), a Bracket cover plate (3.6), a Main gear box mounting flat Bar (3.7), a Protector (3.8), Lifting Arms (3.9), and a Differential gear box fixing plate (3.10);

wherein said Front Cover Plate (3.1), Top Cover plate (3.2), Side cover support plate (3.3) and Front Support square pipe (3.4), cover the Bottom differential Gear box Assembly (4);

Said bracket cover plate (3.6) is attached to said Front Support square pipe (3.4) and configured to cover said Bracket plate (3.5);

Said Bracket plate (3.5) is configured to fix the gears on the back side of tractor;

Said Gear box (2.1) is mounted over the Main gear box mounting flat Bar (3.7);

Said protector (3.8) at the either edges of the main body Assembly (3) protects the main body Assembly (3);

Said Lifting Arms (3.9) connected to the Front Support square pipe (3.4) are provided to lift the main body assembly; and Said Differential gear box fixing plate (3.10) is connected to the bottom differential gear box assembly (4).

4. The multi drill culti rotavator as claimed in claim 1, wherein said Bottom differential Gear box Assembly (4) comprises:

a Differential Gear Box bearing housing (4.1), a Straight Bevel for Differential Gear Box (4.2), an Axle for Differential Gear Box (4.3), and a Differential Gear Box Plate (4.4);

wherein said Differential Gear Box bearing housing (4.1) houses said Axle for Differential Gear Box (4.3) and said Differential Gear Box Plate (4.4) on either sides;

said Differential Gear box (4.3) is configured to transmit the power from Straight Bevel for Differential Gear Box (4.2) to said Gear Axle Assembly (5);

Said Differential gear box plate (4.4) is connected to the Straight Bevel for Differential Gear Box (4.2) and is attached to said gear box (2.1); and Said Axle for Differential Gear Box (4.3) connects Gear Assembly (5) on both sides.

5. The multi drill culti rotavator as claimed in claim 1, wherein said Gear Axle Assembly (5) comprises;

an Axle (5.1), a Flange for Axle (5.2), the plurality of Main spiral Bevel Gears (5.3), a Collar for Main Gear (5.4), a Collar for middle main gear (5.5), wherein said Axle (5.1) is connected to the flange for axle (5.2) supporting the axle (5.1) on one end and to the collar for the main gear (5.4) on the other end, and is configured to rotate the spiral gears;

said collar for main gear (5.4) houses the plurality of Main spiral Bevel Gears (5.3) configured to translate a force from one direction to another direction and enabling rotation of shafts in clockwise and anticlockwise directions.

6. The multi drill rotavator as claimed in claim 5, wherein said Main spiral Bevel Gear (5.3) are six pairs of main spiral bevel gears (5.3).

7. The multi drill culti rotavator as claimed in claim 1, wherein said End Bearing housing Assembly (6) comprises an End Bearing Housing (6.1), an Axle for the End Bearing Housing (6.2), and an End Bearing Housing Cover (6.3);

wherein said end Bearing Housing (6.1) is connected to said end bearing housing cover (6.3);

Said Axle for the End Bearing Housing (6.2) is housed in the end bearing housing (6.1) and is configured to connect with said Gear Axle Assembly (5).

8. The multi drill culti rotavator as claimed in claim 1, wherein said spiral bevel gears (7.4), are in six pairs, said drill bits (7.2) are twelve in number, and said rotavator blades are three rotavator blades in number for each twelve drill bit (7.2).

* * * * *